(12) United States Patent
Hobbs et al.

(10) Patent No.: US 12,072,745 B2
(45) Date of Patent: Aug. 27, 2024

(54) METHOD AND SYSTEM TO EXTEND CMOS BATTERY LIFE

(71) Applicant: Dell Products L.P., Round Rock, TX (US)

(72) Inventors: Derric Christopher Hobbs, Round Rock, TX (US); Eric N. Sendelbach, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 407 days.

(21) Appl. No.: 17/502,555

(22) Filed: Oct. 15, 2021

(65) Prior Publication Data

US 2023/0121936 A1    Apr. 20, 2023

(51) Int. Cl.
*G06F 1/3287* (2019.01)
*G06F 1/14* (2006.01)
*G06F 1/18* (2006.01)
*G06F 1/26* (2006.01)

(52) U.S. Cl.
CPC .............. *G06F 1/26* (2013.01); *G06F 1/14* (2013.01); *G06F 1/183* (2013.01); *G06F 1/3287* (2013.01); *G06F 2221/034* (2013.01)

(58) Field of Classification Search
CPC .................................................. H05K 1/0215
See application file for complete search history.

(56) References Cited

U.S. PATENT DOCUMENTS

| | | | |
|---|---|---|---|
| 5,822,581 A * | 10/1998 | Christeson | G06F 15/7814 |
| | | | 712/E9.007 |
| 7,069,472 B2 | 6/2006 | James et al. | |
| 7,197,657 B1 | 3/2007 | Tobias | |
| 8,433,940 B2 | 4/2013 | Youngs | |
| 9,052,892 B2 | 6/2015 | Ristic et al. | |
| 9,098,305 B2 | 8/2015 | Liu et al. | |
| 10,754,414 B2 | 8/2020 | Hanson et al. | |
| 2007/0096997 A1* | 5/2007 | Nishikawa | H01Q 1/22 |
| | | | 343/702 |
| 2013/0288491 A1* | 10/2013 | Ziarnik | H01M 10/46 |
| | | | 439/51 |
| 2016/0295334 A1* | 10/2016 | Cherigui | G06F 1/24 |
| 2020/0278713 A1* | 9/2020 | Hashemi | G06F 1/30 |

* cited by examiner

*Primary Examiner* — Kim Huynh
*Assistant Examiner* — Cory A. Latham
(74) *Attorney, Agent, or Firm* — ZAGORIN CAVE LLP; Robert W. Holland (57) ABSTRACT

An information handling system main board CMOS is powered by a CMOS battery, such as to keep a real time clock during a power off state, with the battery ground passed through a ground pad so that ground to the CMOS is incomplete until a coupling device, such as a screw, couples the main board to an information handling system housing. A bi-stable relay couples to the main board between the CMOS battery positive terminal and the CMOS to prevent application of power by the CMOS battery to the CMOS after closing of the ground until an embedded controller that is powered on the main board commands closing of the bi-stable relay.

16 Claims, 6 Drawing Sheets

METHOD AND SYSTEM TO EXTEND CMOS BATTERY LIFE

BACKGROUND OF THE INVENTION

Field of the Invention

The present invention relates in general to the field of information handling system battery life, and more particularly to an information handling system method and system to extend CMOS battery life.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems integrate processing components in a housing to process information. A central processing unit (CPU) typically executes instructions stored in a random access memory (RAM) to process the information, such as instructions of an operating system and applications that execute over the operating system. Generally in an off state the CPU and RAM are powered down to preserve power so that a persistent storage device is included to store the operating system and applications in the off state, such as a solid state drive (SSD) or a hard disc drive (HDD). At power up, an embedded controller executes pre-boot code to load the operating system to RAM for execution by the CPU. Typically the pre-boot code first loads a basic input/output system (BIOS) that manages physical devices and their interaction with the operating system. The BIOS generally also recalls settings from a persistent memory of the main board that can include values updated during system power down, such as a time of day. BIOS settings are usually maintained in a complementary metal-oxide-semiconductor (CMOS) that is powered by a battery during system power down, such as a small rechargeable lithium ion battery coupled to the system main board. For example, the CMOS typically tracks a real time clock (RTC) during power down of the information handling system by using power from the CMOS battery. In addition to tracking BIOS settings, the CMOS can track other events during system power down, such as an intrusion event when the system cover is removed, including the time and length of the intrusion incident.

One difficulty with CMOS is that a dead or failed battery will disrupt BIOS initial power up by precluding storage of BIOS settings. To prevent this, manufacturers typically attempt to include a CMOS battery with a life of five years or greater. Generally CMOS designs are either solid-state, such as a relay switch with past/current RTC well controls, which consume power when off, or are non-resettable to a zero-power draw state. Thus, once a CMOS battery is installed on a main board, a gradual power drain typically starts that can drain the CMOS battery if the main board does not have power applied for an extended period of time. An excessive power drain can result in battery failure so that the CMOS will not store BIOS settings even after the main board has power applied. In some instances, a main board or information handling system may be held in stock for an extended time period, such as for service stock or end user spare system stock, resulting in battery degradation and early failure. One solution is to reduce the CMOS battery draw, such as by limiting the functionalities supported by CMOS, however this tends to impact system performance. Another solution is to increase the size of the CMOS battery to hold a larger charge, however this tends to increase system cost. Another solution is a plastic tab that intercedes with the battery contact until removal, however these are difficult to reach when internal to a system housing. Some high power and slow logic devices, such as in automobiles and power control circuits, include bi-stable latching relays to cutoff power draw, however these tend to be expensive and consume main board footprint.

SUMMARY OF THE INVENTION

Therefore, a need has arisen for a system and method which extends CMOS battery life.

In accordance with the present invention, a system and method are provided which substantially reduce the disadvantages and problems associated with previous methods and systems for extending CMOS battery life. An information handling system CMOS ground is incomplete until a coupling device couples the main board to a housing so that no CMOS battery draw down occurs.

More specifically, an information handling system processes information with a processor coupled to a main board that executes instructions in cooperation with a memory storing the information and instructions, the memory interfaced with the processor through the main board. A CMOS coupled to the main board stores BIOS settings during power down of the information handling system, such as by maintaining a real time clock (RTC) with a CMOS battery coupled to the main board. The CMOS battery ground terminal interfaces with the CMOS through a ground pad so that ground is incomplete for the CMOS battery to power the CMOS until a coupling device, such as screw, couples the main board to a housing of the information handling system. For instance the ground pad is a split ground pad that completes ground across a screw inserted in an opening of the main board at the ground pad. In addition, the CMOS battery positive terminal interfaces with the CMOS through a bi-stable relay that maintains an open or closed position commanded by an embedded controller. The bi-stable relay is set to an open position before coupling of the main board to an information handling system housing and then commanded to a closed position at initial power up of the main board. The closed position of the bi-stable relay is maintained during normal system use so that the CMOS battery powers the CMOS during system power down states. An intrusion switch detects an access to the main board, such as when the housing is opened, so that the position of the bi-stable relay may be checked at detection of an intrusion to determine when a main board replacement has occurred. In one example embodiment, a maintenance and/or storage mode of operation of the main board opens the bi-stable relay to remove power from the CMOS by the CMOS battery so that power draw is eliminated, such as when the main board or information handling system is stored as inventory that is not in current use.

The present invention provides a number of important technical advantages. One example of an important technical advantage is that a CMOS battery life is extended by delaying any power draw until an information handling system is first powered up. For example, a battery ground is not completed until the main board having the CMOS is physically coupled to an information handling system chassis. Even after the main board is assembled, a bi-stable latching relay prevents power draw until the information handling system powers up and supports a storage mode that cuts off battery power draw when the information handling system is not in active use. By reducing undesired power draw, a smaller battery may be used that reduces cost. Further, the CMOS may support additional functions that increase power draw and reduce battery life, such as logging and detection functions outside of the platform controller hub real time clock (PCH RTC).

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system CMOS battery selectively connects and disconnects to manage battery drain based upon system usage states. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figures 1, 2:
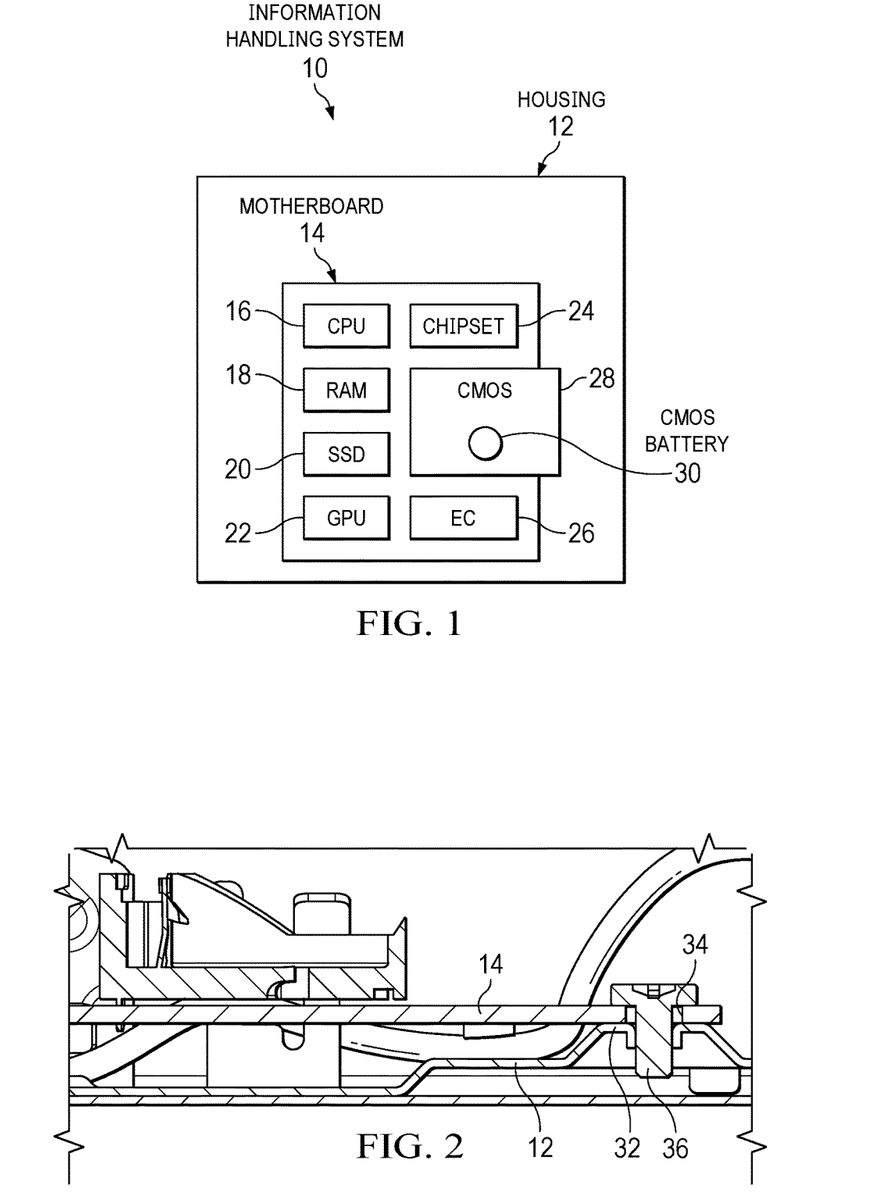
FIG. 1 depicts a block diagram of an information handling system having a CMOS configured with extended CMOS battery life.
FIGS. 2, 2A and 2B depict an example of a ground interface of a CMOS battery to a CMOS at installation of the main board to a housing.

Referring now to FIG. 1, a block diagram depicts an information handling system 10 having a CMOS 28 configured with extended CMOS battery 30 life. Information handling system 10 has processing components built into a housing 12 that cooperate to process information. For example, housing 12 may have a portable configuration, such as a tablet or convertible form factor, a stationary configuration, such as a desktop or tower form factor, a server configuration or other types of more specialized form factors, such as storage devices. A main board 14 couples to housing 12 and includes wirelines that support communications between the processing components. For instance a central processing unit (CPU) 16 couples to main board 14 and executes instructions that process information, such as instructions of a Basic Input/Output System (BIOS), an operating system and applications. A random access memory (RAM) 18 couples to main board 14 and interfaces with CPU 16 to store the instructions and information in support of CPU operations. A solid state drive (SSD) 20 interfaces with main board 14 to provide persistent storage of instructions and information, such as in non-transitory memory like flash. A graphics processing unit (GPU) 22 interfaces with CPU 16 to provide additional processing that defines visual images from the information, such as with pixel values that present colors of pixels in a display. A chipset 24 supports operation of CPU 16, such as with management of memory access and graphics presentation. An embedded controller 26 supports physical systems and operations at main board 14, such as the application of power to components coupled to main board 14, management of thermal conditions in housing 12 and interactions with input/output devices like a keyboard and a mouse. For example, an embedded controller communicates with physical devices and processing components through management interfaces, such as I2C and SMBus, and with device specific general purpose input/output (GPIO) pins.

A CMOS 28 couples to main board 14 to provide management and storage of settings for information handling system 10 during a power down state. When information handling system 10 is powered down, CMOS 28 is provided power with a CMOS battery 30, such as a rechargeable lithium ion coin battery or non-rechargeable coin battery. In some embodiments, the lithium ion battery recharges at main board 14 when power is available from main board 14, although the life of typical coin battery without recharging is often considered sufficient for most commercial systems. CMOS battery 30 may connect directly to the main board 14 or may couple indirectly with a cable assembly and connector as is known in the art. CMOS 28 generally includes a real time clock (RTC) that tracks time of day for the BIOS when CPU 16 is powered down and stores the time in a non-transitory memory, such as an NVRAM. In addition, CMOS 28 may support other functions during system power down states, such as tracking intrusion detection indications by an intrusion detection switch coupled to housing 12 and configured to detect when an access is made to the housing interior. Intrusion detection provides an indication of a possible security breach of the information handling system at a physical level as well as an indication of maintenance of the system. Typically, a standard non-rechargeable lithium ion coin battery should last about 5 years in an information handling system. When the information handling system power is on, there is no power draw from the battery, so only natural discharge occurs. When the information handling system power is off, greater discharge is seen on the coin-cell battery. Based on this operational pattern, an information handling system that is powered-off for a long period of time will drain the battery faster as compared to one that is powered on/off for normal use during that same period of time.

Figure 2A:
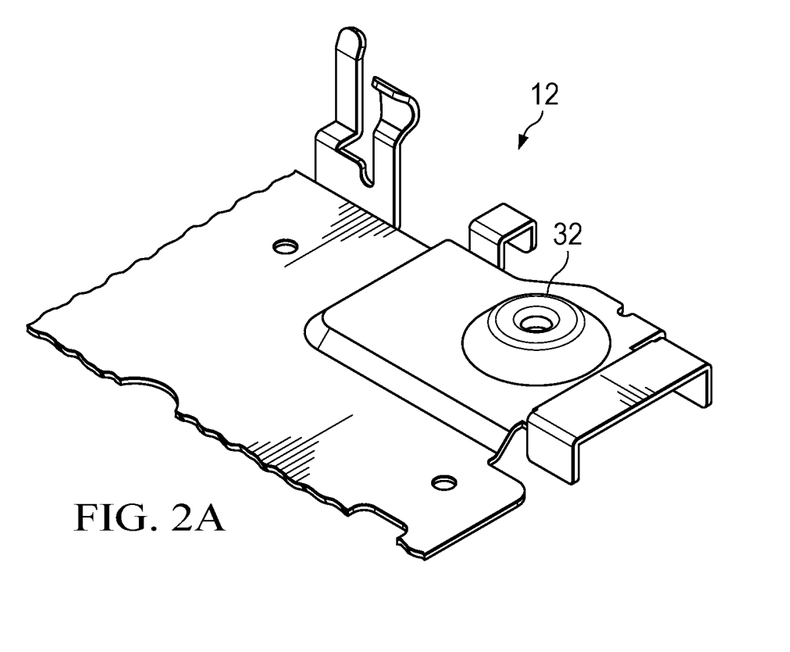
Figure 2B:
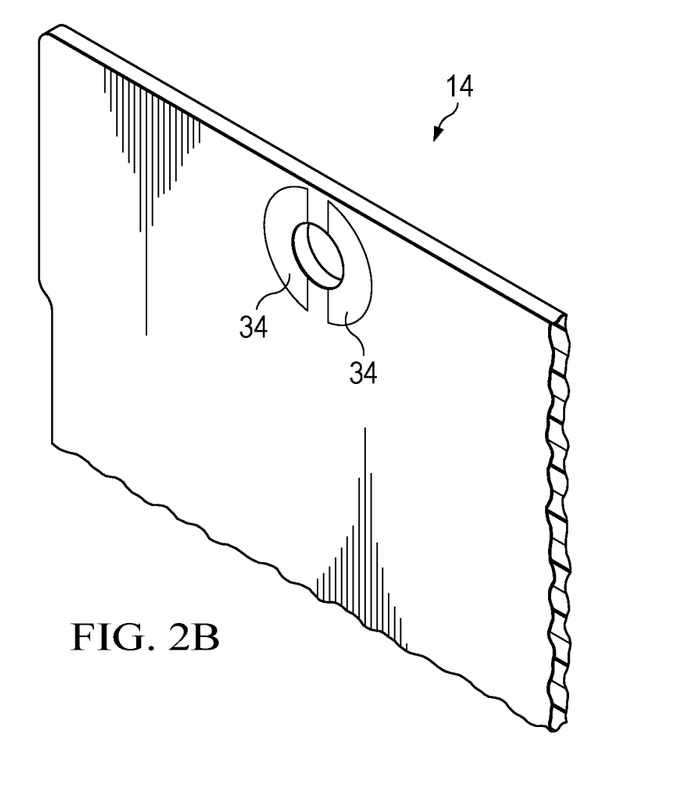

Referring now to FIGS. 2, 2A and 2B, an example depicts a ground interface of a CMOS battery 30 to a CMOS 28 at installation of the main board 14 to a housing 12. FIG. 2 depicts a sectional view of the information handling system depicting main board 14 coupled to housing 12 with a coupling device 36, such as a screw that engages threads of a mounting boss 32. FIG. 2A depicts mount boss 32 having a flat upper surface that engages against the bottom surface of main board 14 to hold main board 14 in a spaced relationship from housing 12, such as to encourage airflow for thermal cooling. FIG. 2B depicts main board 14 having a split ground pad 34 coupled around an opening through which coupling device 36 inserts to couple main board 14 to mounting boss 32. In the example embodiment, one half of split ground pad 34 interfaces with the CMOS battery ground terminal and the other half of split ground pad 34 interfaces with the CMOS power ground pin so that pressing a conductive coupling device 36, such as metal screw, in contact with both sides of split ground pad 34 completes a ground interface between the CMOS and CMOS battery to allow powering of the CMOS by the CMOS battery. In an alternative embodiment, split ground pad 34 and coupling device 36 may complete a ground through housing 12 by the contact of coupling device 36 against mounting boss 32. As another alternative embodiment, the split ground pad may be in the bottom of the main board and completed by the mounting boss with a conductive material disposed on the main boss upper surface. In yet another embodiment, the split pad ground may include a first portion on top of the main board and a second portion on the bottom of the main board so that ground is completed by coupling of the screw to the mounting boss and contact of the mounting boss against the main board lower surface. When the CMOS and CMOS battery ground interface has an independent ground interface, main board 14 may be built, tested and installed in a housing without providing power to the CMOS by not populating the coupling device at split ground pad 34. Similarly, CMOS and CMOS battery operations may be tested by temporarily completing the ground circuit across the split ground pad and closing the bi-stable switch with a command from the system BIOS.

Figure 3A:
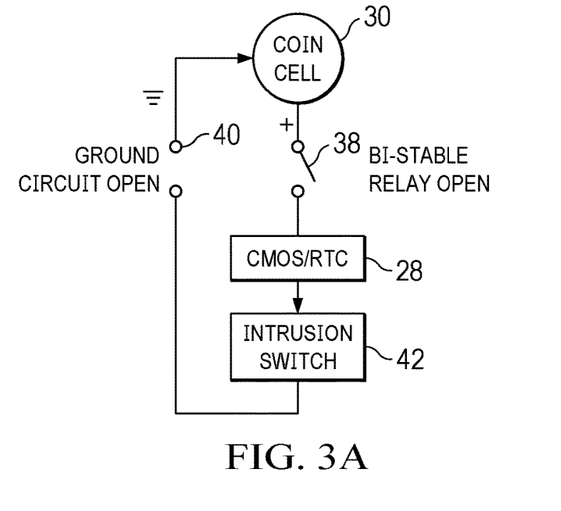
FIGS. 3A, 3B, 3C, 3D and 3E depict flow diagrams of CMOS battery operations to power a CMOS with changes in an information handling system operational state.

Referring now to FIGS. 3A, 3B, 3C, 3D and 3E depict flow diagrams of CMOS battery 30 operations to power a CMOS 28 with changes in an information handling system operational state. FIG. 3A depicts the system state with the main board separate from the information handling system chassis, such as during initial manufacture or storage after manufacture of the main board and before assembly of the information handling system. CMOS battery 30 has a positive terminal that interfaces with a power pin of CMOS 28 through a bi-stable relay 38 configured in an open position, and a ground terminal interfaced with an open ground position 40. In the example embodiment, CMOS 28 interfaces with an intrusion switch 42 that detects when the housing of the information handling system is accessed. With the main board unattached to the information handling system housing, CMOS battery 30 is prevented from a power draw down by open circuits at both the positive and negative terminals, CMOS 28 is prevented from operation absent power provided through the main board, and the storage life of CMOS battery 30 as installed on the main board is essentially the same storage life of CMOS battery 30 separate from the main board since the battery does not draw down power.

Figure 3B:
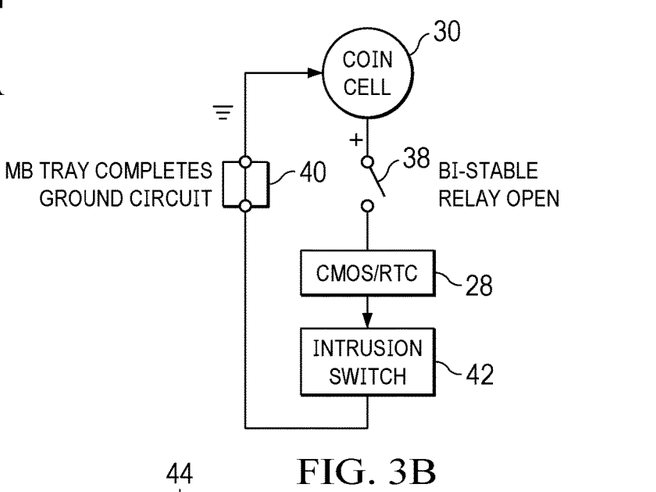
Figure 3C:
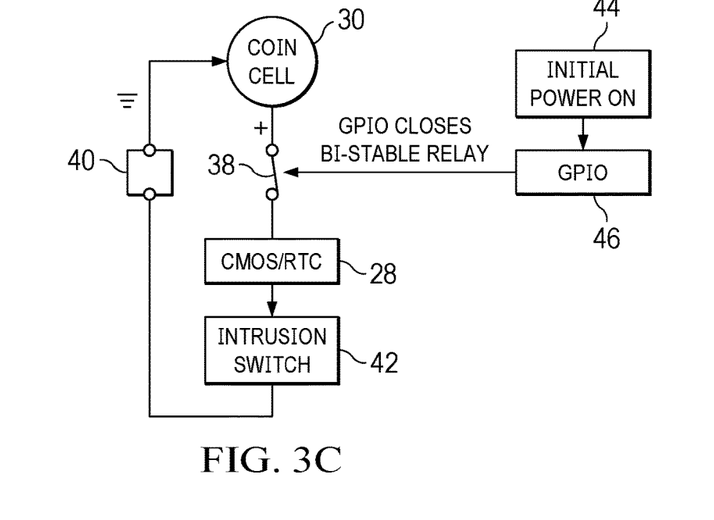

FIG. 3B depicts the CMOS battery 30 and CMOS 28 system state once the main board couples to the housing so that the open ground position 40 is closed by contact of a conductive coupling device against the split ground pad. For example, FIG. 3B depicts an example of an information handling system after assembly of the main board to the housing is complete but before the system is powered on. Bi-stable relay 38 remains in an open position until the position is commanded to close by the embedded controller or other processing resource. Thus, CMOS 28 remains powered off from battery 30 by the open position of bi-stable relay 38. CMOS battery 30 has an interface at a ground terminal with the closing of ground position 40 but provides no power draw since the positive terminal remains isolated by bi-stable relay 38 in the open position. In the example configuration, CMOS 28 may be powered up by the main board, such as to test the functionality of the real time clock and/or intrusion switch 42, however no power will draw from CMOS battery 30. FIG. 3C depicts the CMOS battery system after an initial power up in an operational state commands bi-stable switch 38 to close so that the CMOS battery 30 positive terminal interfaces with CMOS 28 to provide battery power to CMOS 28 when the main board is powered down. In the example embodiment, initial power up logic 44 executes to provide a GPIO 46 command that closes bi-stable relay 38 and support power application by CMOS battery 30 to CMOS 28. As an example initial power on logic 44 is a set of instructions stored in non-transitory memory, such as in BIOS or pre-boot instructions, and executed in part on the embedded controller, which has a GPIO interface with bi-stable relay 38. FIG. 3C depicts a normal operational state of the CMOS battery and CMOS after the information handling system is deployed and in use. Bi-stable relay 38 maintains the closed position until commanded to an open position through GPIO 46.

Figure 3D:
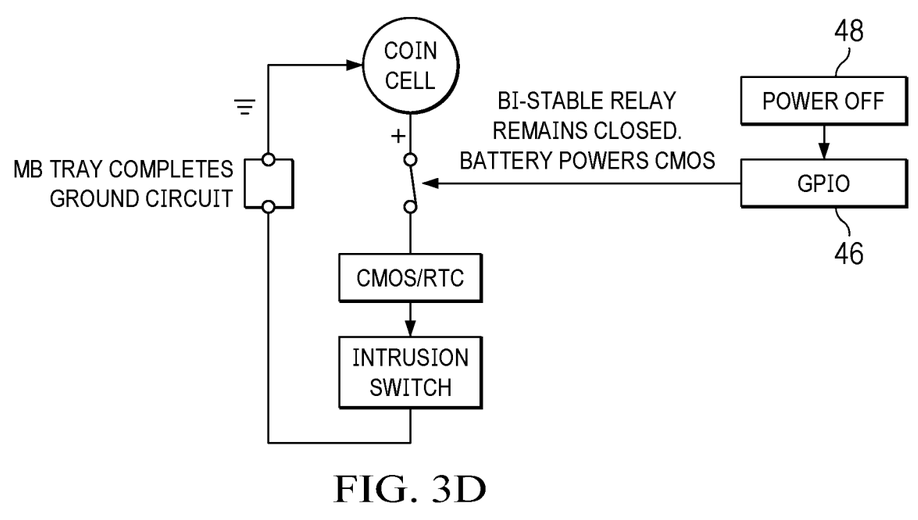
Figure 3E:
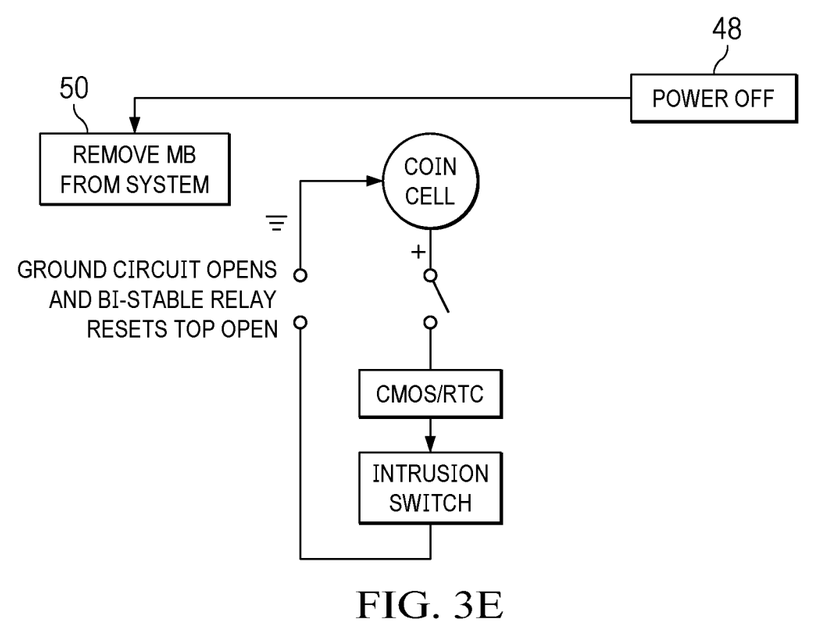

FIG. 3D depicts the normal operational state when the CMOS battery system powers CMOS 28 with CMOS battery 30 while power off logic 48 places the information handling system in a power down state. Unless power off logic 48 commands GPIO 46 to open bi-stable relay 38, CMOS battery 30 will power CMOS 28 to allow tracking of the real time clock, intrusion detection and other BIOS settings. During normal operational use of an information handling system deployed to an end user, periodic power up of the main board will charge CMOS battery 30 to help ensure adequate battery life and avoid excessive battery draw down. When an end user anticipates an extended time period of non-use that might draw CMOS battery 30 to a low power state, power off logic 48 commands GPIO 46 to open bi-stable relay 38 so that power draw by CMOS 28 is cut off during main board power down. The open relay position provides extended storage of a main board or an assembled information handling system without drawing down on CMOS battery 30 charge and risking failure of CMOS battery 30. FIG. 3E depicts storage of the main board and/or information handling system with both the positive and negative terminals of CMOS battery 30 disconnected from CMOS 28. For example, an open split ground pad state 50 is provided by removal of the grounding interface of the coupling device, even where other coupling devices might still couple the main board to the information handling system housing. Power off logic 48 commands the open position of bi-stable relay 38, such as to place the system in a storage configuration with an extended CMOS battery life.

Figure 4A:
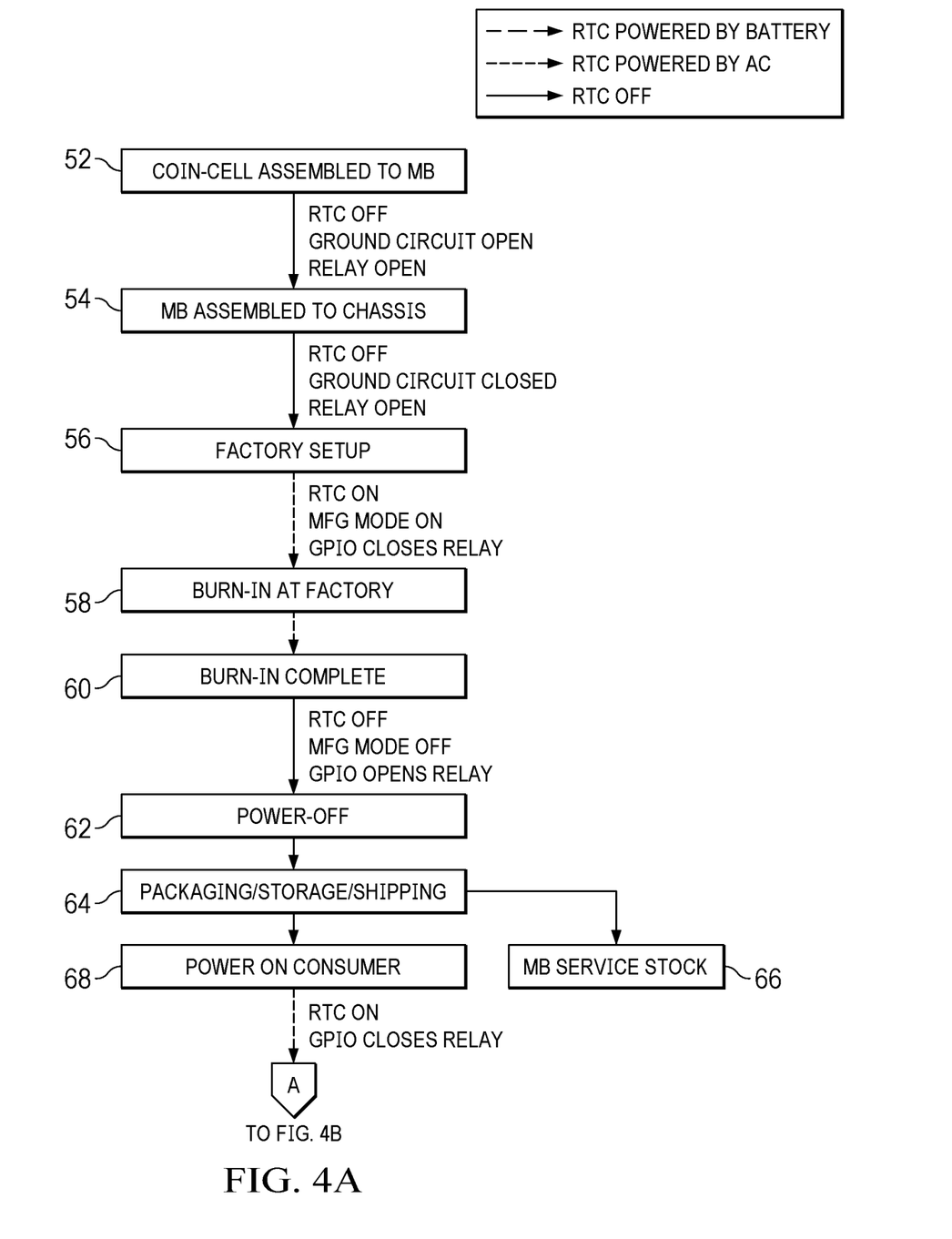
FIGS. 4A and 4B depict flow diagrams of a process for operation of a CMOS battery to power a CMOS in various information handling system operational states.
Figure 4B:
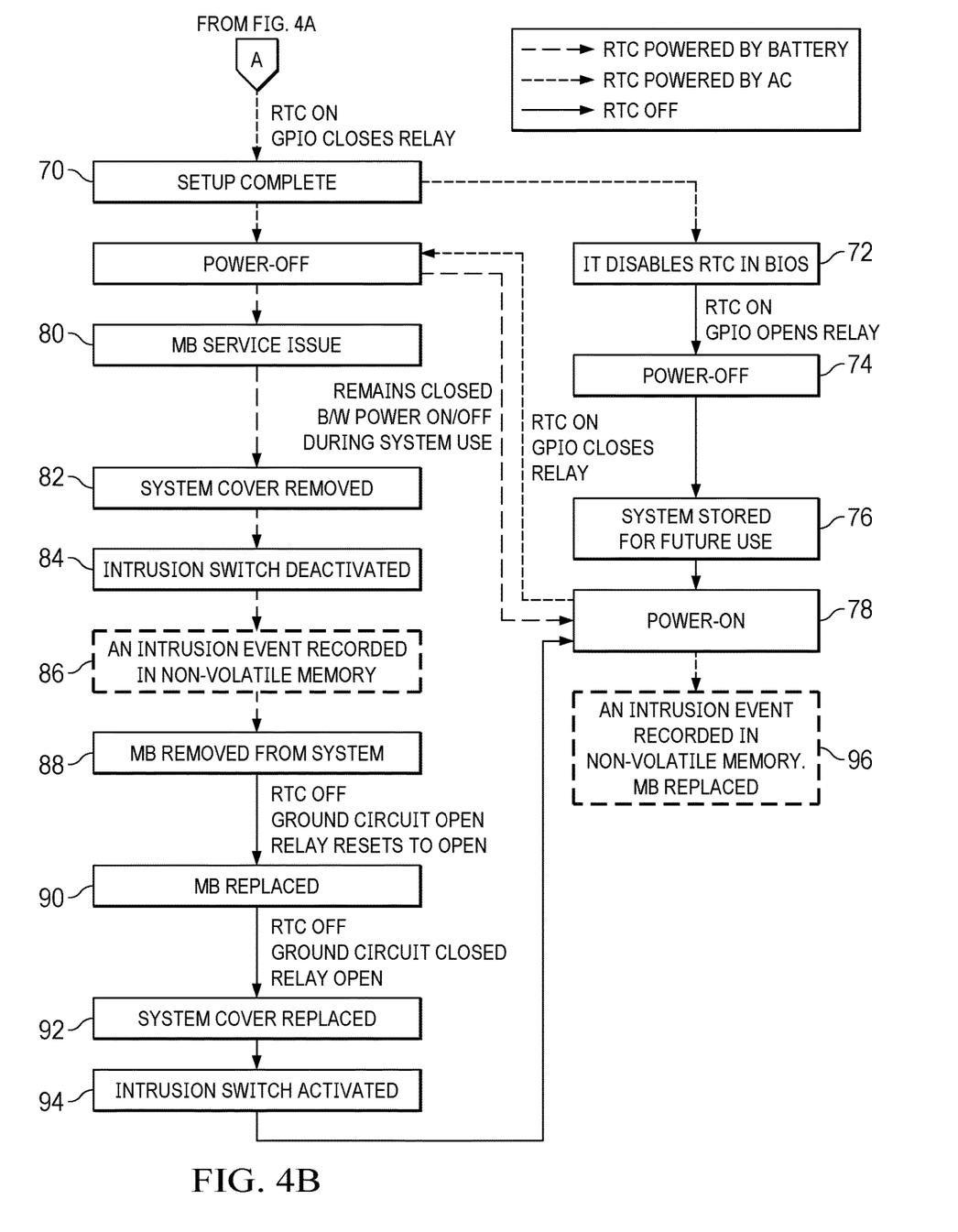

Referring now to FIGS. 4A and 4B depict flow diagrams of a process for operation of a CMOS battery to power a CMOS in various information handling system operational states. The process starts at step 52 with assembly of the coin cell CMOS battery to the main board. With power from the battery cut off by the lack of a ground interface, the process continues to step 54 for assembly of the main board to the housing so that a ground interface is completed between the CMOS battery and the CMOS. Once ground is complete by the coupling device coupling the main board to the housing, the process continues to step 56 with no power draw from the CMOS battery until a factory setup process is initiated as part of the manufacture process. At initiation of the factory manufacturing mode, the embedded controller GPIO to the bi-stable relay commands a close of the relay to provide power draw from the battery so that the battery powers the CMOS, such as during power down periods of the main board. For instance at step 58 burn in of software at the factory often results in multiple restarts of the system so that power is provided at the CMOS by the CMOS battery during any power downs of the main board. Once the software burn in is complete at step 60, the process continues to step 62 with a power off of the main board after a command out of manufacturing mode configures the bi-stable relay to an open position that cuts off power draw from the CMOS battery to the CMOS while the coupling device remains in place to complete the CMOS battery ground. With power draw removed from the CMOS battery for an extended battery life, the completed system or main board may proceed to packaging, storage and shipping at step 64 or may be placed in service stock at step 66. Once the system reaches an end user at step 68 power is applied for an initial use of the system with the CMOS battery life unimpacted by any power draw until the initial power up of the system.

FIG. 4B depicts the process of managing CMOS battery life after an information handling system deploys to an end user and is initially powered up. At step 70 with the initial system power up the GPIO closes the bi-stable relay to complete the CMOS battery power circuit for powering the CMOS when the information handling system is in a power down state. If the information handling system is to be stored for an extended period of time, the process continues to step 72 where an information technology professional may disable the real time clock with a BIOS "storage" command that opens the bi-stable relay to disconnect the CMOS battery positive terminal from the CMOS. With the CMOS powered down, the system powers off at step 74 and is stored at step 76 with the CMOS battery preserved by zero power draw. If at step 70 the information handling system enters operational service, then the process continues to step 78 where the CMOS battery powers the CMOS in system on an off states to maintain the real time clock and monitor for intrusion detection at the housing.

Once the information handling system is deployed for active use at step 78, the CMOS monitors an intrusion detection switch to detect accesses by an end user to the information handling system and compares the intrusion detection against a bi-stable relay position to determine a nature of the intrusion. At step 80, one example of an intrusion is a main board service issue so that at step 82 the housing is removed to expose the main board and thereby, at step 84, trigger the intrusion detection switch. At step 86, the intrusion detection event is stored by the CMOS in nonvolatile memory as part of the BIOS settings. Similarly at step 78 when the intrusion detection switch detects an intrusion to the housing, the CMOS records an intrusion at step 96 by storing a record of the intrusion in nonvolatile memory. From step 96 a similar analysis and intrusion report may be performed as that described at step 86.

Generally, an intrusion detection event can result from an authorized activity, such as maintenance, or an unauthorized activity that involves malicious intent, such as planting malicious code or components in the housing. The CMOS battery maintenance system described above offers an additional piece of information regarding intrusion detection by suggesting whether a main board replacement was involved. For example, if an intrusion is detected and the GPIO does not command a change of the bi-stable switch, this suggests that the main board was not replaced. If the removal of ground from the CMOS results in the bi-stable switch transitioning to an open position, the activity suggests the type of activity involved with the housing intrusion. In the example embodiment, at step 88 the main board is removed from the housing, thereby breaking the ground for the CMOS battery. When the ground circuit opens at step 88, the real time clock and CMOS lose power and the bi-stable relay resets to open. At step 90, a new main board is coupled to the housing to reestablish a ground between its CMOS battery and CMOS. Once the housing is replaced at step 92 an additional intrusion switch activation is detected by attaching the housing and, at step 94 power is applied to the system, setting off an additional intrusion alert. The GPIO closing the bi-switch relay notifies the system that the main board has been replaced. If the real time clock is turned off in the BIOS or after the manufacturing mode, closing the bi-stable relay by the GPIO indicates that the main board CMOS lost power, such as with a ground break, but the main board was not replaced. Messages sent by the embedded controller to an IT maintenance location with the intrusion alerts and the CMOS and CMOS battery state provide clues regarding the nature of the intrusion.

Although the present invention has been described in detail, it should be understood that various changes, substitutions and alterations can be made hereto without departing from the spirit and scope of the invention as defined by the appended claims.

What is claimed is:

1. An information handling system comprising:
    a housing;
    a main board coupled to the housing by a coupling device;
    a processor coupled to the main board and operable to execute instructions that process information;
    a memory coupled to the main board and interfaced with the processor, the memory operable to store the instructions and information;
    an embedded controller coupled to the main board and operable to manage application of power at the main board;
    a CMOS coupled to the main board and interfaced with the embedded controller, the CMOS operable to manage a real time clock when power is absent from the main board;
    a CMOS battery coupled to the main board and having a positive terminal interfaced with the CMOS through the main board to power the CMOS, the CMOS battery having a ground terminal interfaced with the main board with ground to the CMOS open in the main board between the ground terminal and CMOS when the coupling device is absent, the coupling device interfacing the ground terminal to the CMOS through the main board when the coupling device couples the main board to the housing;

a bi-stable relay disposed between a positive terminal of the CMOS battery and the CMOS and interfaced with the embedded controller, the bi-stable relay configured in an open position before the main board couples to housing; and a split ground pad coupled to the main board at an opening of the main board configured to accept the coupling device;

wherein the coupling device comprises a metal screw that passes through the opening and presses against the split ground pad to complete the CMOS battery ground interface.

2. The information handling system of claim 1 further comprising non-transitory memory interfaced with the embedded controller and storing instructions that when executed on the embedded controller cause:

detection that the bi-stable relay has an open position at an initial power up of the main board; and closing the bi-stable relay to couple the battery positive terminal to the CMOS.

3. The information handling system of claim 2 wherein the instructions further maintain the bi-stable relay in the closed position during power down of the main board to maintain power to the CMOS.

4. The information handling system of claim 2 further comprising:

an intrusion detection switch interfaced with the housing and operable to detect an intrusion into the housing;

wherein the instructions further communicate a main board replacement when the intrusion detection switch detects an intrusion and the bi-stable relay has an open position.

5. The information handling system of claim 2 wherein the instructions further:

present at the information handling system a user interface having a CMOS storage configuration; and in response to selection of the CMOS storage configuration selection, opening the bi-stable relay.

6. The information handling system of claim 2 wherein:

removal of the coupling device breaks the CMOS battery ground interface; and removal of CMOS battery power opens the bi-stable relay.

7. The information handling system of claim 1 wherein the ground interface completes with a ground to the chassis by the coupling device.

8. A method for managing an information handling system CMOS battery life, the method comprising:

coupling a CMOS to a main board;

coupling a CMOS battery to the main board, the CMOS battery having a positive terminal interfaced with the CMOS through the main board and having a ground terminal interfaced with an open ground position of the main board, the open ground position not interfaced with the CMOS through the main board;

coupling the main board to a housing with a coupling device;

interfacing the CMOS battery ground terminal with the CMOS through the main board by closing the open ground position with the coupling device;

coupling a bi-stable relay to the main board between a positive terminal of the CMOS battery and the CMOS;

setting the bi-stable relay to an open position before the coupling the main board to the housing coupling a split ground pad to the main board at a screw opening of the main board; and completing the ground between the split pad ground with a conductive screw inserted in the opening to couple the main board to the housing.

9. The method of claim 8 further comprising:

applying power to the main board under the management of an embedded controller;

detecting with the embedded controller the open position of the bi-stable relay; and in response to the detecting, commanding the bi-stable relay to a closed position.

10. The method of claim 9 further comprising:

in response to the detecting, communicating with the embedded controller a main board replacement message.

11. The method of claim 8 further comprising:

commanding a storage configuration of the CMOS; and in response to the storage configuration, commanding the bi-stable relay to the open position.

12. The method of claim 8 further comprising:

coupling an intrusion detection switch to the housing; and detecting a new main board when the intrusion detection switch detects an intrusion and the bi-stable relay has an open position.

13. A system for management of CMOS battery life, the system comprising:

a main board having a battery positive position and ground position;

a CMOS coupled to the main board, the CMOS interfaced through the main board with the battery positive position and open through the main board with the battery ground position;

a CMOS battery coupled to the main board, a positive terminal of the CMOS battery interfaced with the battery positive position, a ground terminal of the CMOS battery interfaced with the battery ground position;

a split ground pad aligned at an opening in the main board and interfaced with the battery ground position at a first side and the CMOS through the main board at a second side, the CMOS lacking an interface with the ground terminal of the CMOS battery unless ground completes across the split ground pad by contact of a conductive coupling device with both the first and second side;

a bi-stable relay coupled between the CMOS and a positive terminal of the CMOS battery;

an embedded controller coupled to the main board and interfaced with the bi-stable relay; and a non-transient memory interfaced with the embedded controller and storing instructions that when executed on the embedded controller detect an open position of the bi-stable relay at application of power to the main board and in response command the bi-stable relay to close.

14. The system of claim 13 wherein the ground pad comprises the split ground pad at an upper surface of the main board that completes ground across the conductive coupling device inserted in the opening.

15. The system of claim 14 further comprising:

an intrusion detection switch operable to detect an access to the main board;

wherein the instructions further cause a main board replacement message when the intrusion detection switch detects the access and the bi-stable relay is open.

16. The system of claim 13 wherein the ground pad comprises the split ground pad at a lower surface of the main board that completes ground across a conductive coupling boss disposed under the main board.

* * * * *